United States Patent
Atkins (10) Patent No.: US 6,443,539 B1
(45) Date of Patent: Sep. 3, 2002

(54) ALGORITHM FOR PREVENTING WHEEL SPEED SNEAKDOWN ON A LOW MU SURFACE

(75) Inventor: Thomas M. Atkins, Ann Arbor, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 09/608,195

(22) Filed: Jun. 30, 2000

Related U.S. Application Data (63) Continuation of application No. PCT/US98/27813, filed on Dec. 30, 1998.
(60) Provisional application No. 60/070,045, filed on Dec. 30, 1997.

(51) Int. Cl.$^7$ .................................................. B60T 8/66
(52) U.S. Cl. ..................... 303/166; 303/164; 303/122.06
(58) Field of Search ............................... 303/166, 164, 303/165, 167, 168, 170, 171, 122.06, 122.07

(56) References Cited

U.S. PATENT DOCUMENTS

| | | | | |
|---|---|---|---|---|
| 4,414,630 A | * | 11/1983 | Harris et al. ................ 364/426 |
| 4,585,280 A | * | 4/1986 | Leiber ........................ 303/100 |
| 4,762,375 A | * | 8/1988 | Maki et al. ................... 303/96 |
| 4,886,322 A | * | 12/1989 | Atkins ........................ 303/109 |
| 4,900,099 A | * | 2/1990 | Braschel ...................... 303/95 |
| 4,916,619 A | * | 4/1990 | Walenty et al. ......... 364/426.02 |
| 4,921,314 A | * | 5/1990 | Braschel et al. ............ 303/110 |
| 5,009,279 A | | 4/1991 | Matsuda |
| 5,071,200 A | * | 12/1991 | McNinch, Jr. .............. 303/110 |
| 5,150,298 A | * | 9/1992 | Fujioka et al. ......... 364/426.02 |
| 5,187,666 A | * | 2/1993 | Watanabe .............. 364/426.02 |
| 5,236,252 A | * | 8/1993 | Phipps ........................ 303/11 |
| 5,242,216 A | * | 9/1993 | Miyawaki et al. ........... 303/106 |
| 5,244,258 A | * | 9/1993 | Van Zanten et al. ........ 303/100 |
| 5,328,254 A | * | 7/1994 | Youngblood ................ 303/100 |
| 5,487,596 A | * | 1/1996 | Negrin ....................... 303/149 |
| 5,538,337 A | * | 7/1996 | Harris et al. ................ 303/156 |
| 5,948,036 A | * | 9/1999 | Okubo ........................ 701/78 |
| 6,205,393 B1 | * | 3/2001 | Batistic ....................... 701/71 |

FOREIGN PATENT DOCUMENTS

| | | |
|---|---|---|
| DE | 195 45 012 A1 | 6/1997 |
| GB | 2 073 344 A | 10/1981 |
| GB | 2 255 602 A | 11/1992 |

* cited by examiner

*Primary Examiner*—Paul N. Dickson
*Assistant Examiner*—Benjamin A Pezzlo (57) ABSTRACT

The duration and average deceleration of a vehicle wheel are measured during a wheel speed departure and compared to duration and deceleration thresholds to determined if a wheel sneakdown condition exists for the wheel.

21 Claims, 6 Drawing Sheets

ALGORITHM FOR PREVENTING WHEEL SPEED SNEAKDOWN ON A LOW MU SURFACE

CROSS REFERENCE TO RELATED APPLICATIONS

This application claims the benefit of U.S. Provisional Application Nos. 60/070,045, filed Dec. 30, 1997, and is a continuation of PCT Patent Application No. PCT/US98/27,813 filed on Dec. 30, 1998.

BACKGROUND OF THE INVENTION

This invention relates in general to algorithms for anti-lock brake systems and in particular to a control algorithm for detecting wheel speed sneakdown on a low mu surface.

Braking a vehicle in a controlled manner under adverse weather conditions, such as rain, snow or ice, generally requires precise application of the vehicle wheel brakes by the vehicle operator. Under these conditions, or in panic stop situations, a driver will often apply excessive brake pressure which causes the vehicle wheels to lock-up such that excessive slippage between the wheels and the road surface takes place. Wheel lock-up conditions can lead to loss of directional stability and, possibly, uncontrolled vehicle spinout. Accordingly, an Anti-lock Brake System (ABS) is often included as standard or optional equipment on new vehicles. When actuated, the ABS is operative to control the operation of the vehicle wheel brakes to prevent lock-up of the associated vehicle wheels. One type of ABS controls only the rear vehicle wheel brakes. Such a system is referred to as a RWAL in the following description.

Figure 1:
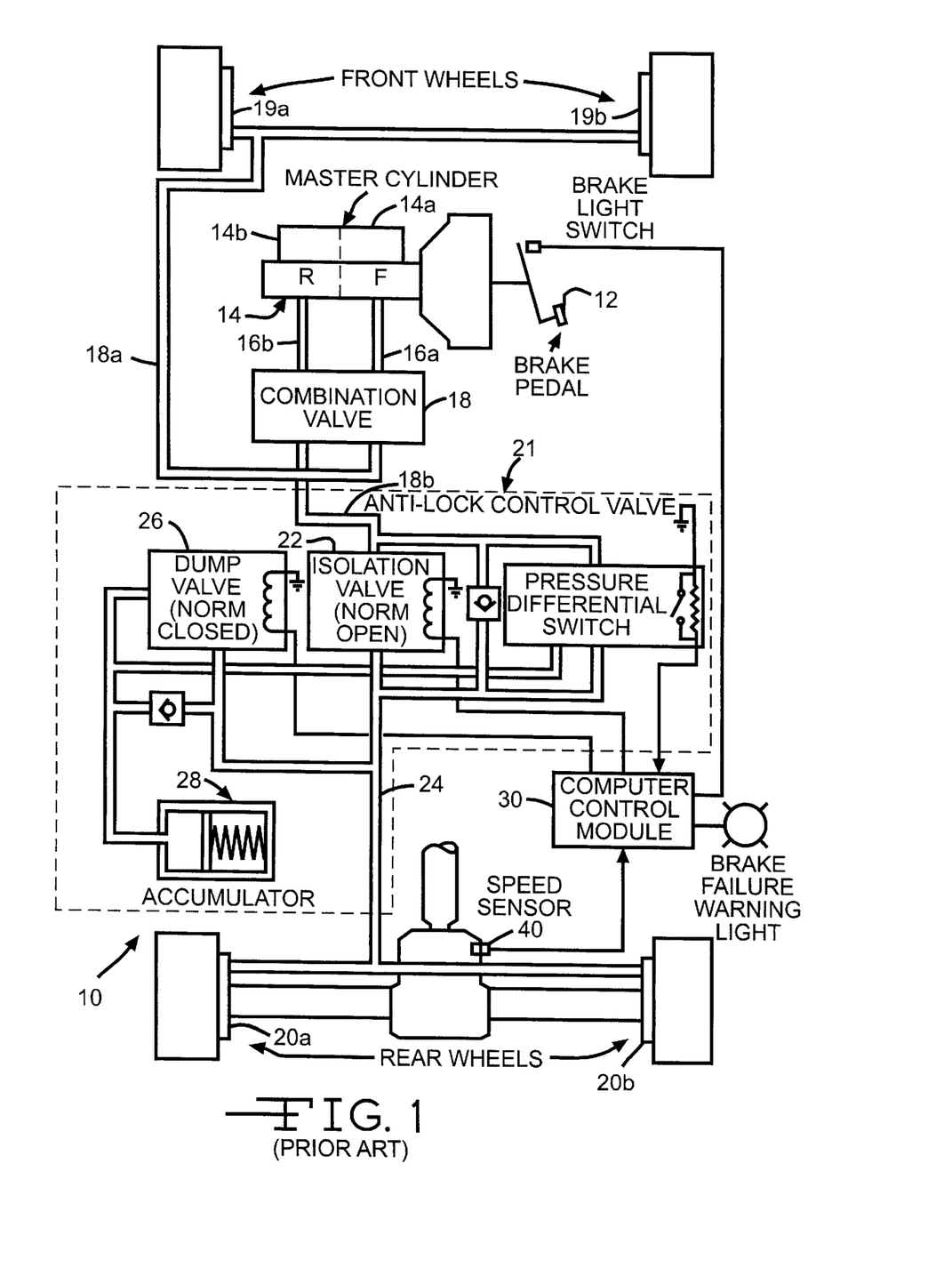
FIG. 1 is a schematic diagram of a prior art passive rear wheel anti-lock brake system.

A typical prior art RWAL system 10 is illustrated in FIG. 1. The RWAL system 10 includes a normally open solenoid valve 22 connected between the vehicle master cylinder 14 and the controlled rear wheel brakes 20a and 20b. When actuated, the normally open solenoid valve 22 closes to isolate the rear wheel brakes 20a and 20b from the master cylinder 14. Accordingly, the normally open solenoid valve 22 is referred to below as an isolation valve. The isolation valve 22 also can be selectively opened to increase the pressure at the rear wheel brakes 20a and 20b. The RWAL system 10 also includes a normally closed solenoid valve 26, which is referred to below as a dump valve. The dump valve 26 is selectively opened to reduce the pressure at the rear wheel brakes by bleeding brake fluid from the rear wheel brakes 20a and 20b to an accumulator 28. The isolation and dump valves 22 and 26 are mounted within a control valve 21.

The vehicle brake system master cylinder 14 provides a source of pressurized hydraulic brake fluid to the RWAL system 10. Thus, a separate hydraulic source, such as a motor driven pump, which is usually included in a four wheel ABS, is not needed. This reduces the complexity and cost of manufacturing the RWAL system 10, which is typically referred to as a passive system. The RWAL system 10 further includes an electronic control module 30 which is electrically connected to a wheel speed sensor 40 and to the isolation and dump valves 22 and 26. The control module 30 can be mounted directly upon the control valve 21 or located remotely therefrom.

The control module 30 includes a microprocessor (not shown) which is programmed to control the RWAL system in accordance with a control algorithm and parameters permanently stored in a Read Only Memory (ROM). Typically, the control algorithm is trimmed for the particular vehicle in which the ABS is installed. The microprocessor also can access a Random Access Memory (RAM) for temporary storage and retrieval of data. A detailed description of the RWAL system 10 illustrated in FIG. 1 is included in U.S. Pat. Nos. 4,790,607 and 4,886,322.

During vehicle operation, the microprocessor in the ABS electronic control module 30 continuously receives speed signals from the wheel speed sensor 40. During a vehicle braking cycle, the ABS microprocessor monitors the rear wheel speed and deceleration. The microprocessor calculates a theoretical speed ramp, which represents the speed the vehicle would travel if decelerated at a predetermined maximum rate, such as, for example, 1.0 g. The microprocessor compares the actual rear wheel speed to the theoretical ramp. If the rear wheel deceleration reaches a predetermined value, such as, for example, 1.3 g, the microprocessor determines that the rear wheel brakes 20a and 20b may be approaching a rear wheel lock-up condition. Accordingly, the ABS microprocessor closes the isolation valve 22 to isolate the rear wheel brakes 20a and 20b from the master cylinder 14. If the rear wheel speed departs form the theoretical ramp in addition to, or in place of, the deceleration condition, the ABS microprocessor determines that the rear wheel brakes 20a and 20b are certainly approaching a lock-up condition and the microprocessor maintains the isolation valve 22 in the closed position. The ABS microprocessor then selectively opens the dump valve 26 to reduce the pressure applied to the rear wheel brakes 20a and 20b to correct the rear wheel speed departure. Once the wheel speed departure has been corrected and the controlled wheel has spun up to the vehicle speed, the microprocessor opens the isolation valve to initiate a second wheel speed departure to adjust the rear wheel brake pressure upward.

Figure 2:
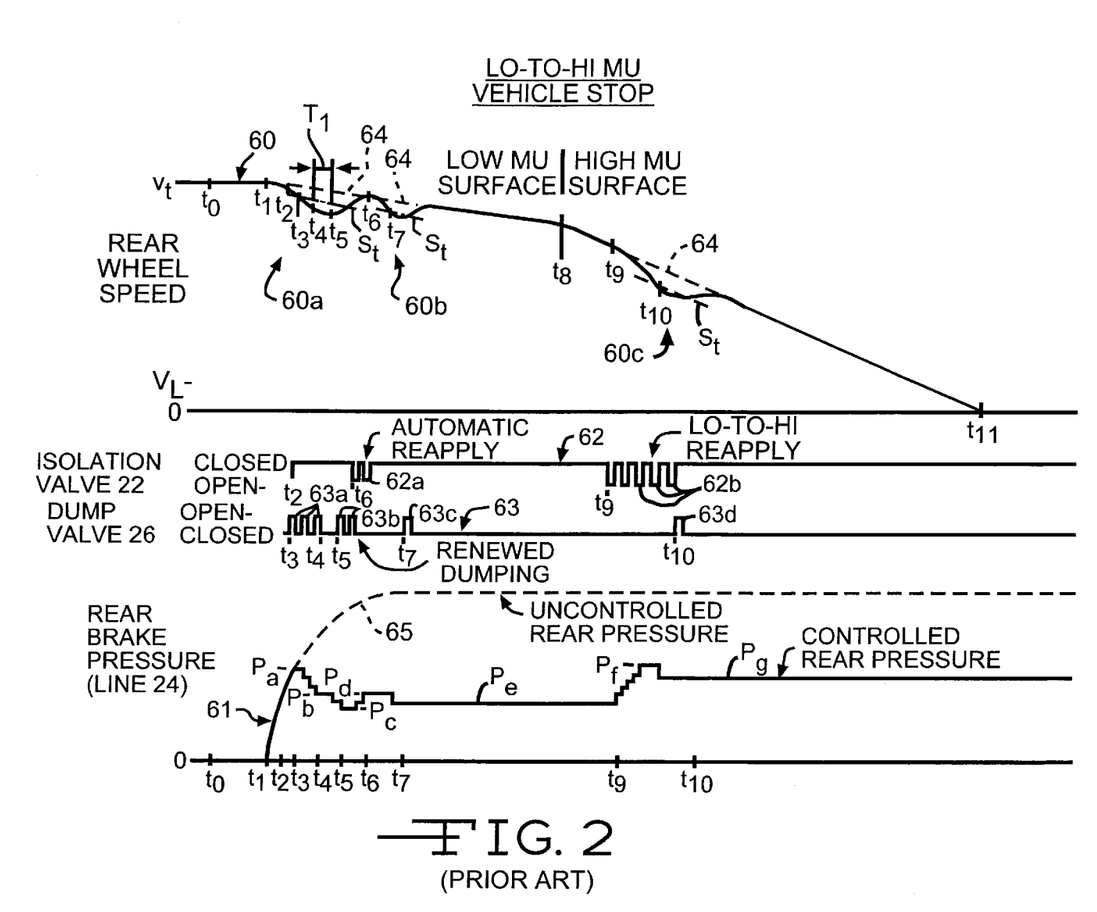
FIG. 2 illustrates the operation of the rear wheel anti-lock brake system shown in FIG. 1.

The operation of the RWAL system is illustrated by the graphs shown in FIG. 2. The upper curve shows the rear wheel speed as a function of time while the lower curve shows the rear wheel brake pressure as a function of time. The middle curves illustrate the operation of the isolation and dump valves 22 and 26 as a function of time. The solid curve labeled 60 represents the velocity of the rear wheels while the dashed curve labeled 64 represents the vehicle velocity. The first and second wheel speed departures are labeled 60a and 60b, respectively. Following correction of the second wheel speed departure, which occurs at time $t_7$, the rear wheel brake pressure is maintained a constant level $P_e$, as shown in the lower curve.

If the vehicle transitions from a low mu to a high mu road surface, a key feature included in the algorithm utilized by the RWAL system 10 is that the braking effort exerted by the rear wheel brakes 20a and 20b can be increased to utilize the increased mu. An example of such a transition is shown at $t_8$ in FIG. 2. The transition can be detected by monitoring the deceleration of rear wheels which can increase due to the greater braking effect of the uncontrolled front wheel brakes 19a and 19b upon the higher mu road surface. If the rear wheel deceleration increases by a predetermined amount, such as 1.0 g, the microprocessor assumes that the change is due to the road surface transition and reopens the isolation valve 22 to generate an unlimited series of reapply pulses 62b. The resulting increased pressure to the rear wheel brakes 20a and 20b initiates a third wheel speed departure, which is labeled 60c in FIG. 2. At time $t_{10}$, a dump pulse is generated to open the dump valve 26 to reduce the rear wheel brake pressure to a level $P_g$ to correct the third rear wheel departure. Thereafter, the rear wheel brake pressure is held at the level $P_g$, which is greater than the previously held level $P_e$.

SUMMARY

This invention relates to an improved control algorithm for an anti-lock brake system which detects wheel speed sneakdown on a low mu surface.

Figure 3:
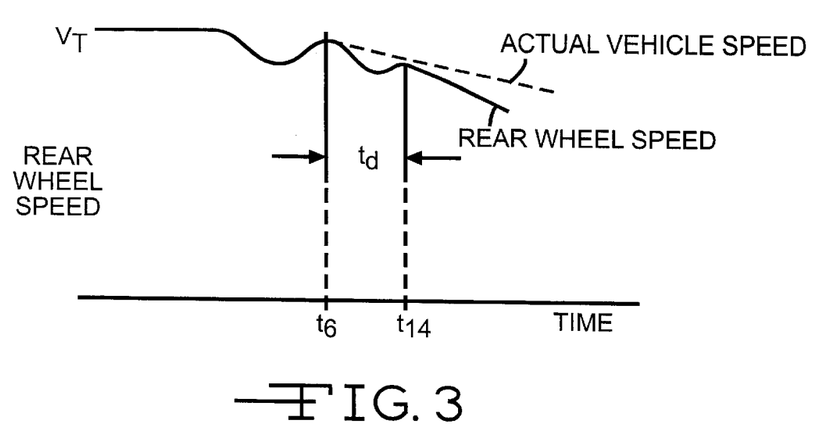
FIG. 3 is a graph which illustrates wheel speed sneakdown.

During an anti-lock brake cycle, it is possible for the rear wheel speed to follow an overall trajectory approaching 1.0 g even though the friction coefficient of the road surface may be in the neighborhood of only 0.1. This condition is often referred to as wheel speed sneakdown. Wheel speed sneakdown can occur gradually or following a wheel speed excursion. An example of wheel speed sneakdown occurring following a wheel speed excursion is shown in FIG. 3 where the solid line represents the rear wheel speed and the dashed line represents the vehicle speed. Similar to FIG. 2, at $t_6$ a second wheel speed excursion is initiated. At $t_{14}$, the wheel speed departure and recovery cycle appears to the ABS microprocessor to have been completed, causing the microprocessor to decide that the rear wheel speed has returned to the vehicle speed and that the wheel speed excursion has ended. Actually, the rear wheel is following a wheel speed curve approximating 1.0 g. Accordingly, when microprocessor samples the rear wheel speed, the microprocessor will determine that a low-to-high road surface transition has occurred. The microprocessor algorithm will then initiate a third wheel speed departure with an unlimited series of reapply pulses even though the vehicle is still on a low mu road surface. The resulting wheel speed departure cycle is wasteful of the limited amount of pressurized brake fluid available in the master cylinder 14.

While the above example is for a second wheel speed excursion, it will be appreciated that wheel speed sneakdown also may occur during an anti-lock braking cycle following the first or any subsequent wheel speed excursion. Wheel speed sneakdown can occur in any ABS not having a G-sensor, but is most severe for RWAL systems, which have only one speed sensor 40. Thus, it would be desirable to detect the presence of wheel speed sneakdown to avoid initiating an unneeded wheel speed departure.

The present invention contemplates a system for controlling at least one vehicle wheel brake which includes a valving device connected to the controlled vehicle wheel brake. The valving device being operable to control application of pressurized fluid to the controlled wheel brake. The system also includes a wheel speed sensor for monitoring the speed of a vehicle wheel associated with the controlled wheel brake. The system further includes a microprocessor coupled to the valving device and the so wheel speed sensor.

The microprocessor is operative to selectively actuate the valving device to control the wheel brake. The microprocessor also is operative to measure a duration of a wheel speed departure of the wheel associated with the controlled wheel brake and to calculate an average deceleration of the wheel during the wheel speed departure. The microprocessor is further operative to set a wheel speed sneakdown flag if the wheel speed departure duration is greater than or equal to a predetermined wheel speed departure duration threshold and the average deceleration greater than or equal to a deceleration threshold.

After setting said sneakdown flag, the microprocessor is further operative to cause the valving device to decrease the pressure applied to the controlled wheel brake. Following the decrease of pressure applied to the controlled wheel brake, the microprocessor can cause the valving device to increase the pressure applied to the controlled wheel brake. Alternately, if the wheel speed departure duration is less than said predetermined wheel speed departure duration threshold, the microprocessor can cause the valving device to increase the pressure applied to the controlled wheel brake. Furthermore, if the average deceleration is less than the deceleration threshold, the microprocessor can cause the valving device to maintain the pressure applied to the controlled wheel brake.

In the preferred embodiment, the deceleration threshold is non-linear function of the wheel speed departure. However, the deceleration threshold also can be predetermined constant or a linear function of the wheel speed departure duration. Also, in the preferred embodiment, the controlled wheel brake is a rear wheel brake and the system is included in a rear wheel anti-lock brake system.

The present invention also contemplates a method for controlling at least one vehicle brake which includes providing a valving device for controlling the application of a pressurized fluid to the controlled wheel brake and a wheel speed sensor for monitoring the speed of a vehicle wheel associated with the controlled wheel brake. Both the valving device and wheel speed sensor are coupled to a microprocessor. The microprocessor measures the duration of a wheel speed departure of the wheel associated with the controlled wheel brake and computes an average deceleration for the wheel during the wheel speed departure duration. The microprocessor then compares the wheel speed departure duration to a predetermined wheel speed departure duration threshold and the average deceleration to a deceleration threshold. The microprocessor sets a wheel speed sneakdown flag if the wheel speed departure duration is greater than or equal to the wheel speed departure duration threshold and the average deceleration is greater than or equal to the deceleration threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The present invention contemplates comparing the duration of a wheel speed departure cycle and the average rear wheel deceleration to predetermined values to determine if wheel speed sneakdown is occurring. The wheel speed departure cycle duration is the time period between the first pressure release pulse and the time at which reapply pulses might begin and is shown as $t_d$ in FIG. 3. It is known that on a relatively high mu road surface, such as wet or dry ordinary asphalt or concrete, the wheel speed departure cycle duration never exceeds a relatively small value. A threshold, $t_{cycle}$, for the maximum departure cycle duration on a high mu road surface is determined for a particular vehicle. In the preferred embodiment, $t_{cycle}$ is equal to 300 milliseconds; however, other values can be used for $t_{cycle}$. If $t_{cycle}$ has been exceeded, then it is known that the road surface is not high mu. If, concurrently, the average rear wheel deceleration during the wheel speed departure cycle is relatively high, then wheel speed sneakdown must be occurring. In the preferred embodiment, a threshold, $T_{DEC}$, for the deceleration of rear wheels of 0.5 g is used; however, other values also can be used.

Figure 4:
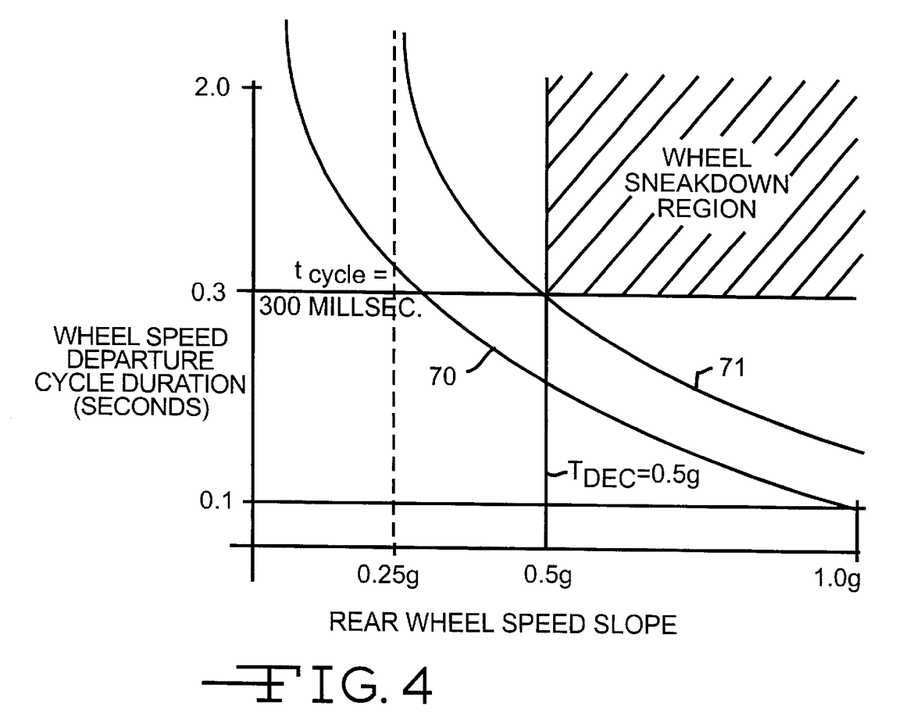
FIG. 4 is a chart showing criteria utilized by the present invention to determine if wheel speed sneak down is present.

The relationship between the wheel speed departure cycle duration and rear wheel speed deceleration is illustrated by the graph shown in FIG. 4 with the horizontal axis representing the slope of the rear wheel speed curve and the vertical axis representing the wheel speed departure cycle duration. The solid curve labeled 70 in FIG. 4 represents the locus of points which correspond to wheel speed departure cycle duration as a function of the rear wheel speed slope. Thus, a rear wheel speed slope of 1.0 g corresponds to a wheel speed departure cycle duration of 100 milliseconds. The points to the left of and below the solid curve 70 represent operation where wheel speed sneakdown is not occurring. The dashed line, which is labeled 71, represents a shifted locus of points to define a guard band, the purpose for which will be explained below. The shaded region, which is bounded by the threshold values of $t_{cycle}$=300 milliseconds and $T_{DEC}$=0.5 g, represents part of the region for which wheel sneakdown is occurring.

Upon determining that wheel sneakdown is occurring, the present invention contemplates generating one or two small pressure release, or dump, pulses to let the wheel speed recover completely to the actual vehicle speed. The algorithm then may generate a small pressure reapply pulse to establish a level of brake torque consistent with achieving good stopping distance on the low mu road surface. The guard band shown in FIG. 4 between the solid curve 70 and the dashed curve 71 is provided to avoid unnecessary dump pulses.

A flow chart for an algorithm for implementing the wheel speed control described above is shown in FIG. 5. In functional block 80, a counter is indexed to measure the length of the wheel speed departure duration, $T_d$. In functional block 81, the rear wheel speed is sampled and the average rear wheel speed deceleration during the wheel speed departure, AVG DEC, is computed. In decision block 82, the algorithm checks to determine if the wheel speed departure cycle has ended. If the cycle has not ended, the algorithm transfers back to functional block 80 to continue timing the cycle duration $t_d$ and computing the average rear wheel deceleration AVG DEC. If the cycle has ended, the algorithm transfers to decision block 83 where the duration $t_d$ of the wheel speed departure is compared to the departure duration threshold $t_{cycle}$. If the cycle duration $t_d$ is less than the threshold $t_{cycle}$, a low-to-high surface mu transition has occurred during the cycle and the algorithm transfers to functional block 84 to set a corresponding flag. The algorithm then transfers to functional block 85 to begin an unlimited series of apply pulses to initiate another wheel speed departure. If the cycle duration is greater than or equal to the departure duration threshold $t_{cycle}$, the algorithm transfers to decision block 86.

Figure 5:
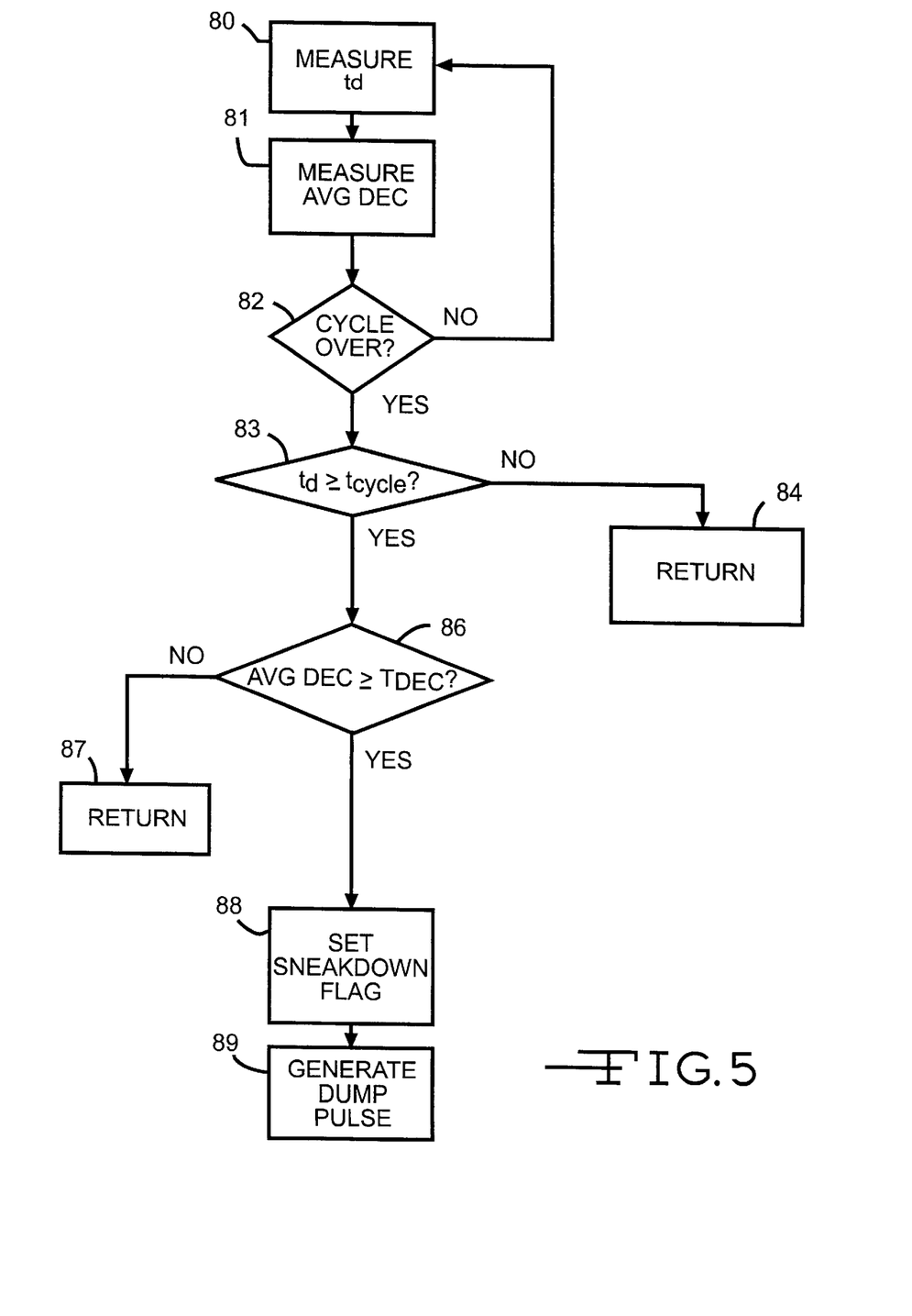
FIG. 5 is a flow chart of an algorithm for applying the criteria shown in FIG. 4.

In decision block 86, the average deceleration AVG DEC is compared to the deceleration threshold $T_{DEC}$. If the average deceleration is less than the threshold $T_{DEC}$, sneakdown is not present and the algorithm transfers to functional block 87 to return to the main program. If the average deceleration is greater than or equal to the threshold $T_{DEC}$, sneakdown is present and the algorithm transfers to functional block 88 to set a corresponding flag. The algorithm then transfers to function block 89 is initiate a small pressure release pulse as described above.

Figure 6:
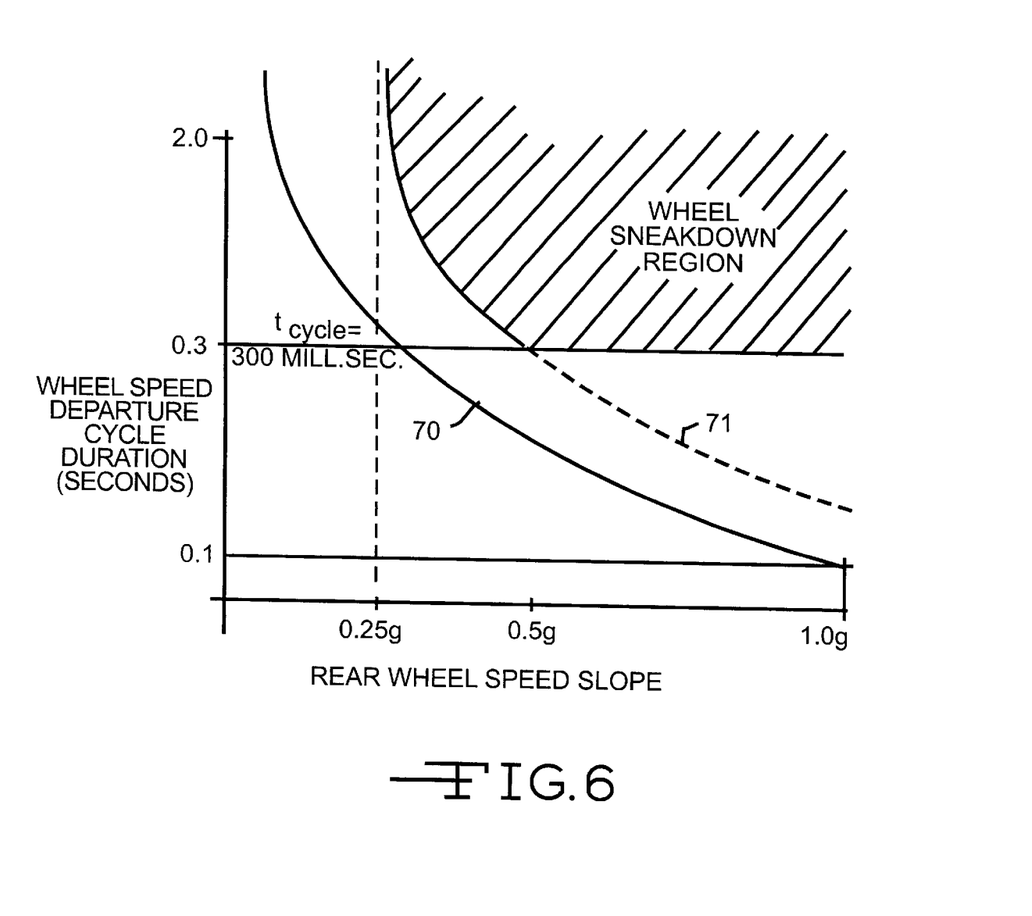
FIG. 6 is a chart showing an alternate criteria utilized by the present invention to determine if wheel speed sneak down is present.

Instead of a fixed deceleration threshold $T_{DEC}$, as described above, the invention also contemplates utilization of a deceleration threshold which is a linear or nonlinear function of cycle duration. A certain minimum cycle duration would still have to be exceeded, but the deceleration threshold would be determined from a functional relationship, such as a point along the line 71 in FIG. 4. An example of such a non-linear relationship is illustrated in FIG. 6 where the wheel sneakdown region has been extended to the line 71 values of $t_{cycle}$ which are greater than 300 millisec. Accordingly, the value for the deceleration threshold $T_{DEC}$ is given by the following relationships:

$$T_{DEC}=-K_1*t_d+K_2, \text{ for } t_d \text{ greater than 300 millisec,}$$

and $$T_{DEC}=0.5*g \text{ for } t_d \text{ less than or equal to 300 millisec,}$$

with $K_1$ equal to the slope of the line 71 in FIG. 6 and $K_2$ being the y-intercept of the line in FIG. 6.

Thus, the deceleration threshold, $T_{DEC}$, for detecting sneakdown would decrease as total cycle duration $t_d$ increases beyond the duration threshold $t_{cycle}$.

Figure 7:
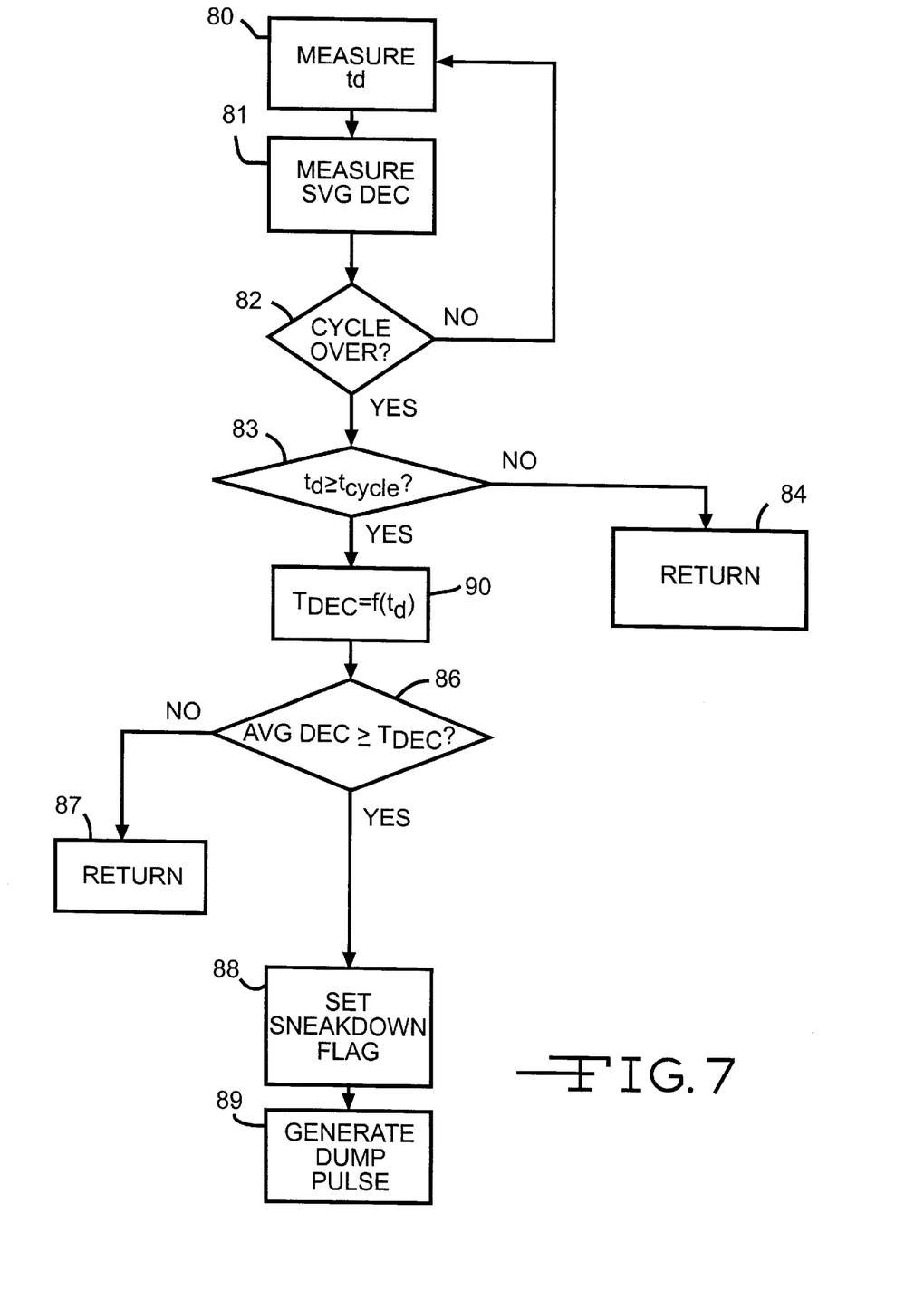
FIG. 7 is a flow chart of an algorithm for applying the criteria shown in FIG. 6.

A flow chart for an algorithm which utilizes the relationship illustrated in FIG. 6 is shown in FIG. 7. Blocks in FIG. 7 which are the same as blocks shown in FIG. 5 have the same numerical designators. As shown in FIG. 7, the difference from the flow chart shown in FIG. 5 is the addition of a functional block 90 in which the deceleration threshold $T_{DEC}$ is calculated as a function of the cycle duration $t_d$. The calculated value for $T_{DEC}$ from functional block 90 is then used in decision block 86. Otherwise, the operation of the flow chart is the same as described above for FIG. 5.

As indicated above, the invention further contemplates that the deceleration threshold $T_{DEC}$ can also be a linear function of the cycle time $t_d$ (not shown).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the flow charts shown and described above are intended to be illustrative and it will be appreciated that the invention also can be practiced with algorithms based upon flow charts which differ from the ones shown and described above.

What is claimed is:

1. A system for controlling at least one vehicle wheel brake, the system comprising:

a valving device adapted to be connected to the controlled vehicle wheel brake, said valving device operable for controlling application of pressurized fluid to the controlled wheel brake;

a wheel speed sensor for monitoring the speed of a vehicle wheel associated with the controlled wheel brake; and a microprocessor coupled to said valving device and said wheel speed sensor, said microprocessor operative to selectively actuate said valving device to control the wheel brake, said microprocessor also operative to measure a duration of a wheel speed departure of said wheel associated with the controlled wheel brake and to calculate an average deceleration of said wheel during said wheel speed departure, said microprocessor further operative to set a wheel speed sneakdown flag if said wheel speed departure duration is one of greater than and equal to a predetermined wheel speed departure duration threshold and said average deceleration is one of greater than and equal to a deceleration threshold.

2. A system according to claim 1 wherein said deceleration threshold is a predetermined deceleration threshold.

3. A system according to claim 1 wherein said microprocessor calculates said deceleration threshold as a function of said measured wheel speed departure duration.

4. A system according to claim 3 wherein said deceleration threshold is a linear function of said wheel speed departure duration.

5. A system according to claim 3 wherein said deceleration threshold is a non-linear function of said wheel speed departure duration.

6. A system according to claim 1 wherein the system is included in a rear wheel anti-lock brake system.

7. A system according to claim 1 wherein said microprocessor is further operative to cause said valving device to decrease the pressure applied to the controlled wheel brake after setting said sneakdown flag.

8. A system according to claim 7 wherein said microprocessor is further operative, following the decrease of pressure applied to the controlled wheel brake, to cause said valving device to increase the pressure applied to the controlled wheel brake.

9. A system according to claim 8 wherein the controlled wheel brake is rear wheel brake.

10. A system according to claim 9 wherein the system is included in a rear wheel anti-lock brake system.

11. A system according to claim 1 wherein said microprocessor also is operative to cause said valving device to increase the pressure applied to the controlled wheel brake if said wheel speed departure duration is less than said predetermined wheel speed departure duration threshold.

12. A system according to claim 1 wherein said microprocessor also is operative to cause said valving device to maintain the pressure applied to the controlled wheel brake if said average deceleration is less than said deceleration threshold.

13. A method for controlling at least one vehicle wheel brake, the method comprising the steps of:

(a) providing a valving device for controlling the application of a pressurized fluid to the controlled wheel brake and a wheel speed sensor for monitoring the speed of a vehicle wheel associated with the controlled wheel brake, the valving device and wheel speed sensor being coupled to a microprocessor;

(b) using the microprocessor to measure the duration of a wheel speed departure of the wheel associated with the controlled wheel brake;

(c) using the microprocessor to compute an average deceleration of the wheel associated with the controlled wheel brake during the wheel speed departure;

(d) comparing the wheel speed departure duration to a predetermined wheel speed departure duration threshold;

(e) comparing the average deceleration to a deceleration threshold when the wheel speed departure duration is one of greater than and equal to the wheel speed departure duration threshold in step (d); and (f) setting a wheel speed sneakdown flag when the average deceleration is one of greater than and equal to the deceleration threshold in step (e).

14. A method according to claim 13 further including, after setting the wheel speed sneakdown flag is step (f), causing the valving device to decrease the pressure applied to the controlled wheel brake.

15. A method according to claim 14 further including, after decreasing the pressure applied to the controlled wheel brake, causing the valving device to increase the pressure applied to the wheel brake.

16. A method according to claim 13 further including causing the valving device to increase the pressure applied to the controlled wheel brake if, in step (d), the wheel speed departure duration is less than the predetermined wheel speed duration threshold.

17. A method according to claim 13 further including causing the valving device to maintain the pressure applied to the controlled wheel brake if, in step (e), the average deceleration is less than the deceleration threshold.

18. A method according to claim 13 wherein the deceleration threshold in step (e) is a predetermined deceleration threshold.

19. A method according to claim 13 wherein the deceleration threshold in step (e) is a function of the wheel speed departure.

20. A method according to claim 19 wherein the deceleration threshold is a linear function of the wheel speed departure duration.

21. A method according to claim 19 wherein the deceleration threshold is a non-linear function of the wheel speed departure duration.

* * * * *